United States Patent [19]

Masclet

[11] 4,119,179

[45] Oct. 10, 1978

[54] BRAKE DISC STRUCTURE

[75] Inventor: Jean Masclet, Paris, France

[73] Assignee: Messier-Hispano, Montrouge, France

[21] Appl. No.: 806,506

[22] Filed: Jun. 14, 1977

[51] Int. Cl.² .................. F16D 69/04; F16D 65/12
[52] U.S. Cl. .................. 188/73.2; 188/218 X L;
   188/251 A; 192/70.13; 192/70.14; 192/107 R
[58] Field of Search ............... 188/71.5, 73.1, 73.2,
   188/218 XL, 251 A; 192/70.13, 70.14, 107 R

[56] References Cited

U.S. PATENT DOCUMENTS

| | | | |
|---|---|---|---|
| 2,033,835 | 3/1936 | Lansing | 192/104 R |
| 3,730,320 | 5/1973 | Freeder et al. | 188/218 XL X |
| 3,754,627 | 8/1973 | Hotchkiss | 188/218 XL X |
| 3,804,213 | 4/1974 | Lucien et al. | 188/218 XL X |
| 3,857,469 | 12/1974 | Stimson | 188/218 XL X |
| 3,936,552 | 2/1976 | Krupp et al. | 188/251 A X |

FOREIGN PATENT DOCUMENTS 1,500,824  10/1967  France ................. 188/218 XL Primary Examiner—George E. A. Halvosa
Attorney, Agent, or Firm—Haseltine, Lake, & Waters

[57] ABSTRACT

A disc brake comprising a plurality of alternating stators and rotors each comprising a friction lining at least one of which is constituted by a support and a shoe engaged in the support. Each shoe comprises a first part of larger cross-section and a second part of smaller cross-section extending from the first part and defining therewith a shoulder, the shoe being mounted in a support having an aperture constituted by a first bore of larger diameter extending partly in the depth of the support and a second bore of smaller diameter extending in the remainder of the depth of the respective support so as to define a shoulder against which the shoulder of the shoe can bear. Two adjacent shoes are disposed in respective supports to face in opposite directions in such supports. Furthermore, the shoes in adjacent supports are geometrically identical.

16 Claims, 14 Drawing Figures

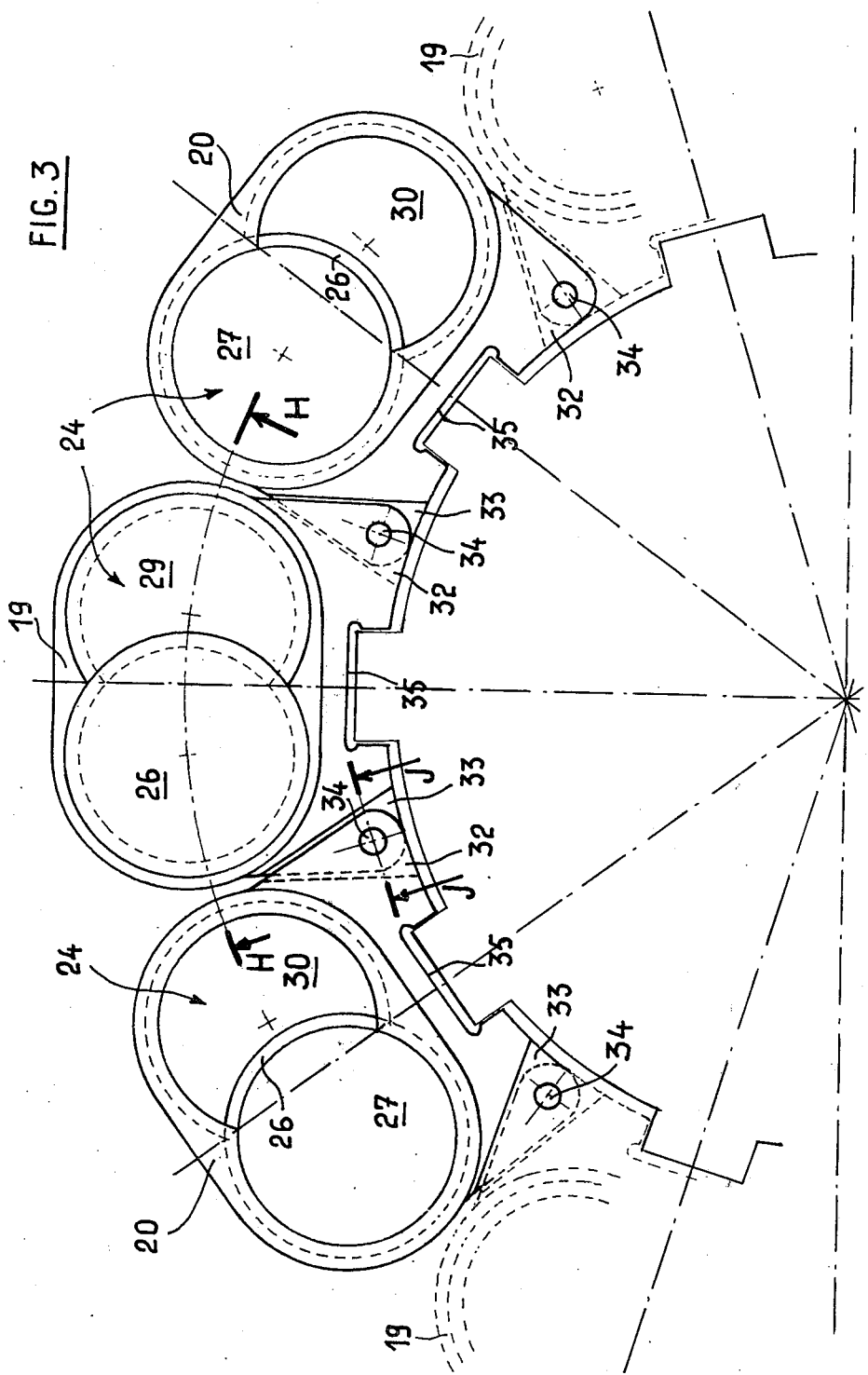

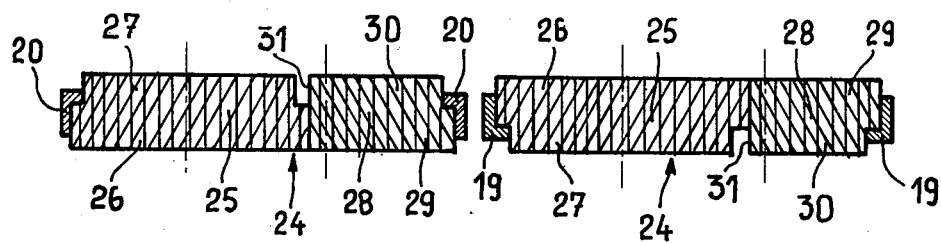
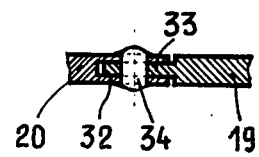
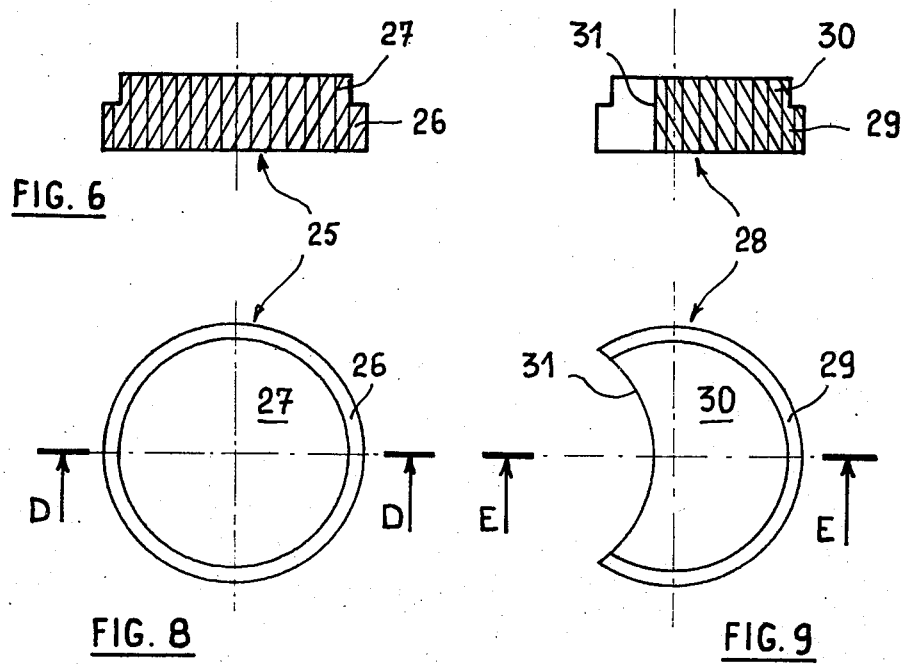

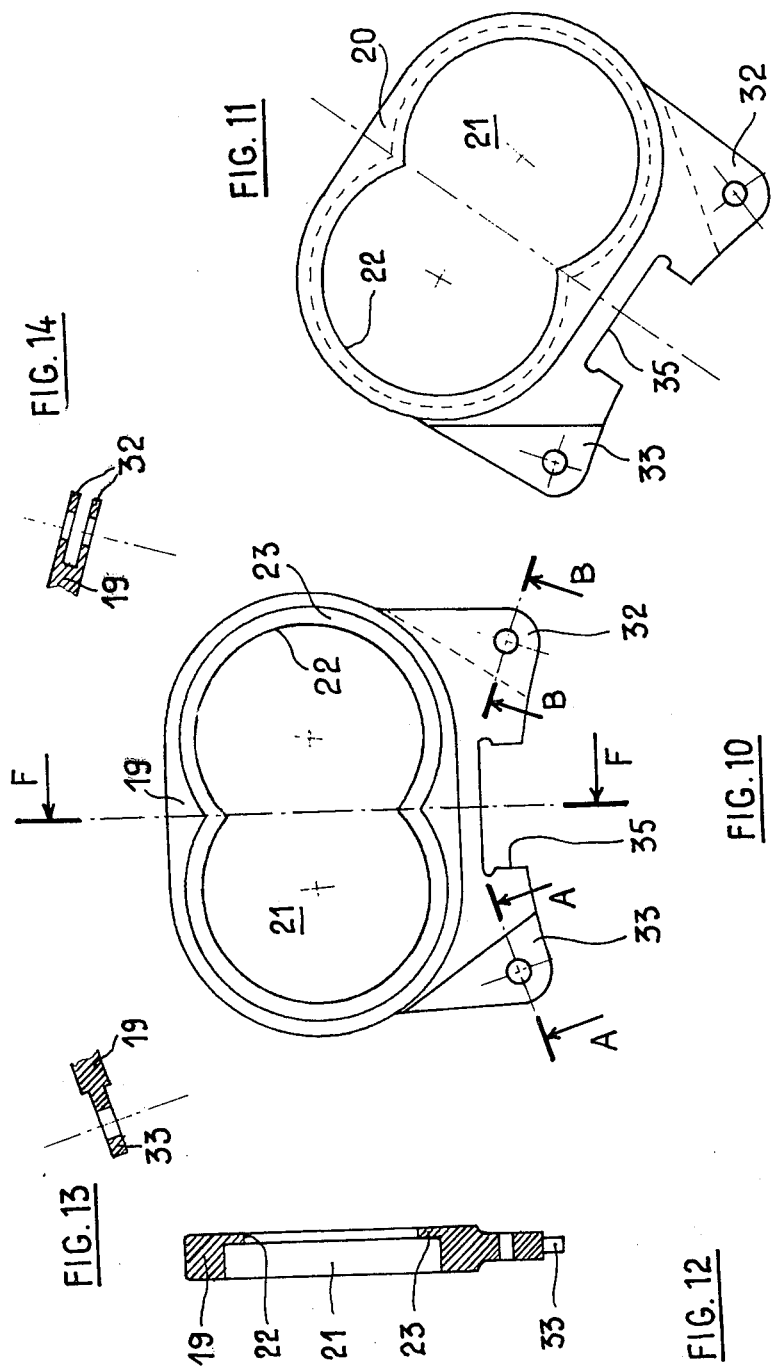

BRAKE DISC STRUCTURE

FIELD OF THE INVENTION

The present invention relates to disc brakes in general and more precisely to disc brakes suitable for use on aircraft and provided with heat shafts using graphite.

PRIOR ART

In known manner, a disc brake is essentially composed of two main elements:

a framework which applies the pressure of one or more friction linings rigid with non-rotating supports onto one or a plurality of rotating discs, which may or may not be equipped with friction linings and driven by the moving body which is to be braked, the friction thus created generating a braking torque producing a force to decelerate the moving body;

a heat shaft constituted essentially by the rotationally rigid lining or linings and the rotationally driven disc or discs and likewise by the fixed supports, the assembly consisting of one lining and one fixed support constituting a non-rotating structure or stator and the assembly consisting of one lining and of one rotating support constituting a rotating structure or rotor.

In the aerospace industry, in which disc brakes are currently used, which have to meet evermore exacting conditions of performance, endeavour has been to make these brakes increasingly lighter in weight and to make their admissible temperature ever higher. With this in mind, attempts have been made to use new materials for the heat shaft. One of these new materials is graphite, which has excellent thermal characteristics, but a major drawback to its use in such a case resides in the fact that its mechanical characteristics are poor.

In order to remedy these disadvantages, disc brakes have been made in which the friction linings are wholly or partly constituted by graphite plates, each plate being seated in a cavity in a rotor or a stator, each cavity being less deep than the thickness of the plate, and the wall of each cavity being parallel with the contours of the plate, fixing means being provided to hold each plate in its cavity. These fixing means may be provided by adherence, for example by adhesives, welding, brazing, directly or through one or more pre-layers of metallizing material or transition graphite. According to a particular embodiment of these brakes, on each of the two faces of a rotor or of a stator of which both faces are operative, the cavities on the two faces match each other in pairs and their plates are held, two by two, by a single rivet having two flush countersunk heads, each located in one plate and traversing each plate with a certain radial clearance.

These known brakes may be constituted by rotors made in the form of honeycombed rings and stators in the form of rings of associated and honeycombed repetitive angular segments or even rotors and stators which are in both cases made in the form of rings composed of honeycombed segments, as respectively described in French Pat. Nos. 2,108,233 and 2,144,942.

Furthermore, it is known that the research by users with a view to minimizing manufacturing and operating costs has resulted in the establishment of a new characteristic in aeronautical equipment in general and particularly in brakes; this characteristic is the cost per landing. From this point of view, the known disc brakes referred to hereinabove exhibit a number of disadvantages which result in brakes which are costly both to produce and to operate. For example, the machining both of the lateral surface and of the bottom of each cavity must be carefully performed; the shoes provided in a brake are very numerous and by virtue of its small thickness each is delicate to produce and remains fragile; riveting is also a very delicate operation, the performance of which is likely to damage the shoes; finally, the lining supports must be specially designed so that as far as possible they retain a satisfactory flatness during operation.

Furthermore, when the shoes are made from graphite, it is advisable for the transmission of braking stresses of the graphite plates to their supports by the fact that the plates bear on the edges of each cavity, to take place by compression, due to the fact that the strength of the graphite is then at its best. To this end, the graphite plates are deeply embedded in the cavities in the supports, the small amount by which each plate protrudes from the framework constituting the only thickness which can be worn out. This means that shoes have to be replaced frequently.

SUMMARY OF THE INVENTION

Research carried out by the Applicants has resulted in the construction of a disc brake according to the present invention which does not have these drawbacks and which is characterized in that at least one of the friction linings carried by the rotors and stators but preferably in all of the linings, is made by means of shoe traversing apertures provided in the corresponding lining support, each shoe comprising a part of larger section, or body, which is an extension from a part of smaller section, or head, defining with the body a shoulder by which the shoe bears on the edge of the aperture through which it passes, and in that two neighboring shoes are disposed in opposite directions in the corresponding support.

Naturally, it is advantageous for the shoes all to be geometrically identical and to traverse likewise identical apertures of a contour corresponding to the contour of the head of the shoes, at a close given interval to allow thermal expansion in operation.

Therefore, in comparison with known brake plates, the shoes thus defined have the advantages of being fewer in number in each brake for one and the same effective surface area, and that each is at least twice as thick as the plates, which means that they are less fragile and more easily produced and installed on their support.

In view of the fact that a part of the body of each shoe, thanks to the shoulder, covers a given surface area of the support, the friction surface and therefore the effective surface of the brake is increased. Moreover, the consumable thickness on each face of the shoe is increased due to the fact that the latter bears on the inside wall of the aperture through which it passes, that is to say through the intermediary of an area which for identical external mass, is larger than that defined by the lateral wall of two cavities, in order to transmit the braking force exerted by a sufficiently moderated pressure which is therefore compatible with the mechanical characteristics of the graphite.

Finally, riveting is eliminated and the machining of the supports simplified.

In a preferred form of embodiment, each aperture is defined by a bore provided in the central part of a facing made in the lining support so that the parts of the body and of the head of the shoe bordering the shoulder can be seated respectively in the facing and in the bore in the aperture, to within the said given interval.

In this way, the bearing of the shoe in its support is improved and the consumable thickness is still further increased since the entire thickness of the body of the shoe which is extending beyond the support can be used, which cannot happen when the aperture is constituted by a bore only, in which case it is absolutely necessary to retain a residual thickness of the body in order to define the shoulder.

According to the invention, there is moreover at least one lining support provided by means of the said shoes, and preferably each of the supports of the rotors and/or of the stators, consists of a monobloc ring, on the surface of which the said cavities are regularly distributed. This embodiment characterized in that all the supports are identical and simple to produce, has the advantage of being very economical.

In another form of embodiment of brake according to the invention, at least one lining support provided by means of the said shoes and preferably each of the supports of the stators and/or of the rotors, is constituted by a ring composed of repetitive angular segments fitted to one another and each provided with at least one aperture. In view of the fact that the use of rings divided into repetitive angular segments offers notable well-known advantages in the elimination of deformations of rotors and stators due to thermal stresses created during braking, this solution ensures the provision of friction surfaces which remain plane.

In the event that each aperture in each segment is defined by a facing i.e. a first bore of larger diameter and a second bore of smaller diameter, the strength of the segment is improved; on the other hand, it will be necessary to provide two series of compatible segments if the mechanical means of assembling the segments to one another are not absolutely symmetrical.

According to the invention, it is likewise envisaged that the bore in each aperture should be of a form which is homothetic vis-a-vis that of the facing in the central part of which the bore is made and, when the supports are constituted by segments, that the said facing should be of a form similar to the general form of the segment which may for example be a rounded trapezoidal form.

According to another example, the form of each facing and likewise of each bore is bounded by two cylinders offset from the axis of symmetry of the segment in question.

Under these conditions, each of the said shoes may correspond to the juxtaposition of two shoe elements each having the form of a stack of two elements in the form of a frustum of a cylinder, of different sections and cut along one segment, so that each of the two elements occupies half of the facing and of the bore, these elements being juxtaposed along the cut segment, aligned on the axis of symmetry of the segment in question. The advantage of this arrangement is that it opposes any possible rotation of the shoes under the effect of the friction forces.

In order to improve the distribution of stresses occurring between two shoe elements in the course of braking, and in order to ensure between them a permanent contact which will not give rise to any wear on the shoes, each shoe may be constituted by the juxtaposition of a first element in the form of an assembly of two frustocylindrical elements of different sections, and a second element which takes the form of a notched assembly of two frustocylindrical elements of different cross-section, and the notch in which exactly fits at least around a portion of the periphery of the first element.

According to the invention, the friction linings are preferably constituted by graphite shoes while the lining supports may be of metal or graphite.

The disc brake which is the object of the present invention may further be characterized in that one of the two assemblies which constitute the stators on the one hand and the rotors on the other, comprise lining supports each of which consists of a monobloc ring, and in that the other assembly has lining supports each of which consists of a ring composed of repetitive angular segments.

In a particular form of embodiment, it is the stators which comprise lining supports, each constituted by a ring composed of repetitive angular segments, receiving the shoes of polycrystalline graphite, while the rotors each consist of a monobloc circular ring of structural graphite.

In order to connect segments into a ring, each repetitive angular segment is provided on its periphery with a fork and a lug so that the said fork receives the lug of one of the two segments adjacent to the segment in question and so that the said lug is received into the fork of the other adjacent segment, the rigidity between fork and lug being effected by reason of a spindle passing through the fork and the eye in the lug.

In order to ensure symmetrical wear on the linings, prolonging the effective life of the brake, the parts of the body and of the head of the shoe projecting on either side of the support are of equal thickness.

BRIEF DESCRIPTION OF THE DRAWINGS

The present invention will be more clearly understood from the ensuing description which is given in respect of the attached drawings, in which:

FIG. 3 is an elevational view of part of a stator mounted on the left-hand part of the brake shown in FIG. 1;

FIGS. 4 and 5 are partial sectional views respectively on the lines H—H and J—J in FIG. 3;

FIGS. 6 and 7 are sectional views respectively on the lines D—D and E—E through the two shoe elements shown in elevation in FIGS. 8 and 9;

FIGS. 10 and 11 show in elevation two consecutive segments constituting the stator according to FIG. 3, and FIGS. 12 to 14 are sectional views respectively on the lines FF, AA and BB in FIG. 10.

DETAILED DESCRIPTION

Figure 1:
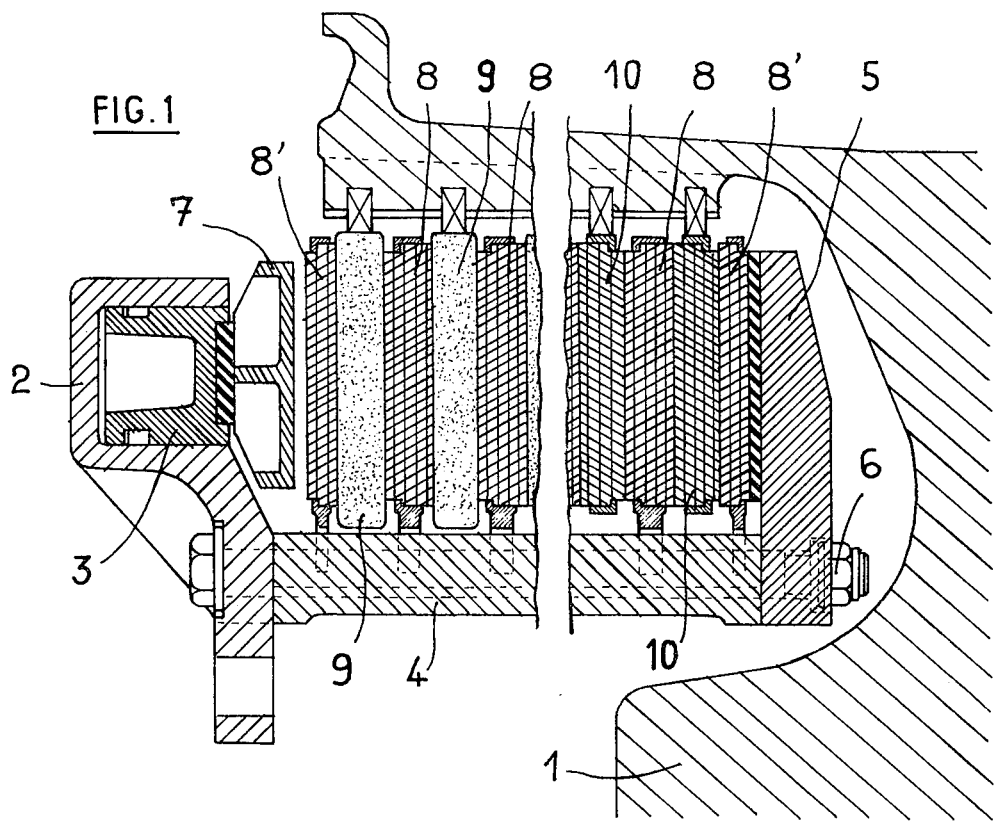
FIG. 1 is a cross-section through the axis of rotation and through—

With reference to FIG. 1, the brake housed in the wheel 1 comprises a framework constituted by a cylinder block 2 provided with pistons 3 applying the pressure, a torque tube 4 accepting the stresses of the stator torque, a rear plate 5 against which the elements of the heat shaft are pressed by the pistons 3, bolts 6 for assembling the elements and a thrust plate 7 for distributing the pressure.

The heat shaft of the brake is constituted by stators, both central stators 8 and end stators 8', and by one or a plurality of rotors, of which two different types 9 and 10 are respectively shown on the left and on the right in FIG. 1; the stators 8 and 8' and rotors 9 or 10 are constituted by supports fitted with friction linings. The support of each stator 8 or 8' takes the form of a ring composed of repetitive angular segments bearing on one another and receiving shoes constituting the friction lining.

Figure 2:
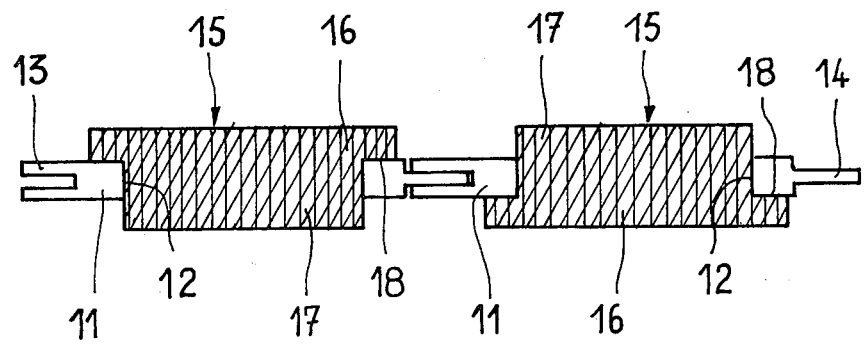
FIG. 2 is a sectional view diagrammatically showing a first embodiment of stator capable of use in the brake shown in FIG. 1.

FIG. 2 diagrammatically shows a first embodiment of stator 8 consisting of segments 11 in each of which there is an aperture 12, and which comprise a fork 13 and a lug 14 by which they can be engaged with one another. The apertures 12 are traversed by shoes 15 comprising a body 16 and a head 17 separated by a shoulder 18 by reason of which the shoe 15 bears on the edge of the aperture 12 which it traverses and the shoes 15 are so disposed that two adjacent shoes 15 traverse their respective apertures in opposite directions. The contours of the apertures 12 correspond to the contours of the head 17 of the shoes 15, to within a given interval, allowing expansion and contraction due to heat in operation.

With reference to FIG. 3 which shows a second embodiment of stator 8 such as is used on the brake indicated in FIG. 1, the stator 8 is composed of a plurality of repetitive angular segments 19 and 20 disposed alternately and constituting respectively the object of FIGS. 10 and 11, each segment 19 or 20 having an aperture 21 defined by a bore 22 provided in the central part of a facing 23 constituting a second bore of larger diameter made in the segment 19 or 20 (see FIGS. 4 to 12), the form of the bore 22 being homothetic in relation to that of the facing 23. The cut-out in the facing resembles the overall form of the segment 19 or 20 in such a way as to accommodate a shoe 24 of considerable friction surface area.

The form of each facing 23, like the form of each bore 22, is defined by two cylinders which are offset from the axis of symmetry of the segments 19 or 20, and each shoe 24 is constituted by the juxtaposition of a first element 25 taking the form of an assembly of two cylindrical portions, of which one, 26, is of larger cross-section than the other, 27, and a second element 28 in the form of an assembly of two half moons 29 and 30 obtained by providing in an element 25 a notch 31 which exactly matches a portion of the periphery of 26 so that the portion of cylinder 27 and the half moon 30 constituting the head of the shoe 24 are fitted into the bore 22 in the aperture 21 and so that the portion of cylinder 26 and the half moon 29 constituting the body of the shoe 24 fit into the facing 23 of the aperture 21, to within a given clearance, allowing expansion under heat in operation.

It will be noted from FIG. 4 that the part of the body of the shoe 26, 29 which projects from the segments 19 or 20 is of a thickness equal to that of the part of the head of shoe 27, 30 which projects from the segment 19 or 20, this balancing the friction surfaces, and giving the brake a greater thickness of consumable lining for an equal thickness of support in respect of the arrangement shown in FIG. 2 in which the shoes 15 have to be replaced before the entire body 16 has been worn out.

As FIGS. 3, 5, 13 and 14 show, the segments 19 and 20 each have on their inner periphery, on one side a fork 32 and on the other side a lug 33 so that the fork 32 of any segment 19 can receive the lug 33 of the segment 20 which is adjacent to it on one side, and so that the lug 33 of this segment 19 can be received into the fork 32 of the segment 20 which is adjacent to it on the other side. Symmetrically, for any segment 20, rigid connection between fork 32 and lug 33 is effected by a spindle 34 passing through the fork 32 and the eye of the lug 33 and the two ends of which are bent over onto the fork 32. Furthermore, in the central part of its inner periphery, each segment 19 and 20 carries a notch 35 adapted to receive a pin carried by the torque tube 4, and immobilizing the stators in respect of the vehicle on which the brake is mounted.

Associated with the stators which have just been described, the rotors 9 may, as illustrated on the left-hand side of FIG. 1, take the form of a monobloc circular ring constituting simultaneously the support and the lining. Advantageously, this monobloc ring 9 is made from structural graphite while the shoes 24 accommodated in steel segments 18 and 20 are made from polycrystalline graphite.

The term structural graphite must be understood as meaning any graphite having a considerable proportion of carbon or graphite rods or gauze, such rods or gauze being disposed in superposed layers connected inter se either by gaseous diffusion or by successive impregnations with polymerized materials, then carbonized or graphitized, whereas the term polycrystalline graphite must be taken to mean any graphite obtained by compression under heat either of particles of graphite or particles of carbon which then undergo more or less extensive graphitization.

Thus, by using two types of graphite to make the friction shoes of the heat shaft, it is possible to obtain a definite relation of braking torque, which is an important characteristic for a disc brake, as is well known from patents of additions Nos. 2095179 and 2323924 to French Pat. No. 2108233. The association of two types of graphite of different qualities may likewise take place between stator and rotor themselves: it is possible to have each segment of a stator fitted with two types of shoes of different graphites and to have each rotor likewise equipped with two types of shoes of different graphite or even with shoes made from other sintered, metallic, organic or or mixed materials.

Under these conditions, like the stators, the rotors are made in the form of a ring of repetitive angular segments assembled to one another. Such rotors are shown at 10 in the right-hand part of FIG. 1. In an advantageous form of embodiment, the mechanical assembly means are identical and the rotors and stators differ only by virtue of the location of the notches intended to receive the splines for making the rotors rigid respectively on the wheel and on the vehicle: the notches 35 of the stators are situated on their internal periphery while the notches on the rotors are preferably placed on their external periphery.

The end stators 8' may be identical to the central stators 8, but the transverse mass of the brake produced may be reduced by choosing end stators 8' which differ from the central stators 8 in that the thickness of the shoes on the non-friction surface is reduced, as is the width of the support and thus of the segments.

According to the invention, the lining supports of the rotors and stators made in the form of a monobloc ring or a ring composed of associated segments may be made from metal or metallic alloy having good mechanical characteristics, good heat resistance and a low density, for example titanium, beryllium, steel and alloys thereof, and also structural graphite.

The form of embodiment previously described in respect of graphite shoes could likewise be applied to a brake having friction linings composed of any sintered, metallic or organic or suitable mixed material.

Furthermore, the number and the geometrical form of the segments and of the apertures provided in each segment may be modified.

Finally, the means of rendering the rotors and stators respectively rigid with the wheel and the vehicle and also the mechanical means of assembling segments inter se may be similar to those described in French Pat. Nos. 1301317 (and its Addition No. 87527), 2108233 and 2144942.

I claim:

1. A disc brake comprising a plurality of stators and at least one rotating rotor interposed between two stators, said stators and rotors each comprising a friction lining, at least one of the friction linings comprising a support and a shoe engaged in said support, each shoe comprising a first part of larger cross-section and a second part of smaller cross-section extending from the first part and defining therewith a shoulder, two adjacent shoes being disposed in respective supports to face in opposite directions in such supports so that a first part of one shoe is adjacent a second part of another shoe on the same side of the support, the shoes in adjacent supports being geometrically identical, each support having an aperture in which the respective shoe is engaged, each aperture being constituted by a first bore of larger diameter extending partly in the depth of the respective support and a second bore of smaller diameter extending coaxially with the first bore in the remainder of the depth of the respective support and defining a shoulder therewith, said first and second parts of the shoe being respectively received by the first and second bores in the support with the shoulder of the shoe bearing against the shoulder of the support, said first and second parts of the shoe having contours corresponding to the bores in the support and being seated therein with slight clearance to permit heat expansion in operation, each shoe providing a braking surface on opposite sides of its support.

2. A brake according to claim 1 in which at least one lining support formed by said shoes is constituted by a monobloc ring on the surface on which said apertures are regularly distributed.

3. A brake according to claim 1 in which at least one lining support formed by said shoes is constituted by a ring composed of repetitive angular assembled to one another and each provided with at least one aperture.

4. A brake according to claim 3, in wich said second bore has a form similar to the general form of the segment.

5. A brake according to claim 4 in which each segment has a generally rounded trapezoidal form.

6. A brake according to claim 4 in which the form of said first and second bores is defined by two cylinders offset from the axis of symmetry of the segment in question.

7. A brake according to claim 6 in which each of said shoes comprises the juxtaposition of two shoe elements each having the form of an assembly, cut along one segment, of two portions of cylinders of different cross-sections so that each of the two elements occupies half the first and second bores, said elements being juxtaposed along the cut segment aligned on the axis of symmetry of the segment in question.

8. A brake according to claim 6 in which each shoe is constituted by the juxtaposition of a first element having the form of an assembly of two portions of cylinders of different cross-sections, and a second element having the form of a notched assembly of two portions of a cylinder of different cross-sections and in which the notch exactly fits around at least one portion of the periphery of the first element.

9. A brake according to claim 1, in which the said second bore in each aperture has a cross-section of a form homothetic to that of the first bore and is made in the central part of the latter.

10. A brake according to claim 1 in which the shoes of the friction linings are constituted by graphite.

11. A brake according to claim 1, in which the lining supports are metallic.

12. A brake according to claim 1, in which the lining supports are made from graphite.

13. A brake according to claim 1, in which the lining supports of one of the two assemblies constituted by the stators on the one hand and the rotors on the other consists of a monoblock ring, the other assembly comprising supports consisting of a ring composed of repetitive angular segments.

14. A brake according to claim 1, in which the lining supports of the stators each comprises a ring composed of repetitive angular segments receiving shoes of polycrystalline graphite, the rotors each being constituted in the form of a monoblock circular ring of structural graphite.

15. A brake according to claim 14, in which each repetitive angular segment includes on its periphery a fork and a lug so that the said fork can receive the lug of one of the two segments adjacent to the segment in question and so that the said lug may be received into the fork of the other adjacent segment, and a connection for the fork and lug, including a spindle passing through the fork and the eye of the lug.

16. A brake according to claim 1 in which the parts of the shoe which project on either side of the support are of equal thickness.

* * * * *

UNITED STATES PATENT AND TRADEMARK OFFICE
CERTIFICATE OF CORRECTION

PATENT NO. : 4,119,179
DATED : October 10, 1978
INVENTOR(S) : MASCLET

It is certified that error appears in the above-identified patent and that said Letters Patent are hereby corrected as shown below:

On The Title Page Insert

-- Claims priority France 76 18.620 June 18, 1976 --.

Signed and Sealed this

Seventh Day of August 1979

[SEAL]

Attest:

LUTRELLE F. PARKER
Attesting Officer  Acting Commissioner of Patents and Trademarks